United States Patent
Antonelli et al.

(10) Patent No.: US 10,409,455 B2
(45) Date of Patent: Sep. 10, 2019

(54) SELECTION SYSTEM FOR AN INTERACTIVE DISPLAY

(71) Applicant: Telecom Italia S.p.A., Milan (IT)

(72) Inventors: Fabrizio Antonelli, Povo (IT); Mattia Pasolli, Povo (IT); Massimo Zancanaro, Trento (IT)

(73) Assignee: Telecom Italia S.p.A., Milan (IT)

( * ) Notice: Subject to any disclaimer, the term of this patent is extended or adjusted under 35 U.S.C. 154(b) by 356 days.

(21) Appl. No.: 14/653,219

(22) PCT Filed: Dec. 17, 2012

(86) PCT No.: PCT/EP2012/075775
§ 371 (c)(1),
(2) Date: Jun. 17, 2015

(87) PCT Pub. No.: WO2014/094820
PCT Pub. Date: Jun. 26, 2014

(65) Prior Publication Data
US 2015/0331559 A1   Nov. 19, 2015

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 1/1626* (2013.01); *G06F 1/1694* (2013.01);
(Continued)

(58) Field of Classification Search
CPC ......... G06F 3/0346; G06F 2203/04806; G06F 3/0481; G06F 3/017; G06F 3/0482;
(Continued)

(56) References Cited

U.S. PATENT DOCUMENTS 6,137,472 A * 10/2000 Pekelney ............ G06F 3/04892
715/858
8,760,425 B2 * 6/2014 Crisan ................. G06F 3/04883
345/173
(Continued)

FOREIGN PATENT DOCUMENTS

| CN | 102638611 A | 8/2012 |
| EP | 1914631 A1 | 4/2008 |
| EP | 2490419 A1 | 8/2012 |

OTHER PUBLICATIONS

Jul. 1, 2013—(WO) International Search Report—App PCT/EP2012/075775.
(Continued)

*Primary Examiner* — Di Xiao
(74) *Attorney, Agent, or Firm* — Banner & Witcoff, Ltd.

(57) ABSTRACT

A system for selecting, through a mobile device provided with accelerometer sensors, items of lists that can be displayed on a visual display of an interactive display system, is provided. The system includes a receiver located at a surface of a user interaction station distinct from the visual display and adapted to wirelessly receive data from the mobile device when in short range communication with the mobile device. The system further comprises a processor adapted to collect acceleration data received through the receiver and generated by the accelerometer sensors in response to movements of the mobile device carried out when the mobile device is in short range communication with the receiver. The processor is further adapted to associate the collected acceleration data with corresponding selection values over a selection scale. The processor is also adapted to control the interactive display system to select items based on the selection values.

19 Claims, 8 Drawing Sheets

(51) Int. Cl.
  *G06F 3/0484* (2013.01)
  *G06F 3/0488* (2013.01)
  *G06F 3/0485* (2013.01)
  *G06F 1/16* (2006.01)
  *G06F 3/0346* (2013.01)
  *H04W 4/80* (2018.01)
(52) U.S. Cl.
  CPC .......... *G06F 3/0346* (2013.01); *G06F 3/0485* (2013.01); *G06F 3/0488* (2013.01); *G06F 3/04842* (2013.01); *H04W 4/80* (2018.02); *G06F 2200/1637* (2013.01)
(58) Field of Classification Search
  CPC .. G06F 3/0383; G06F 3/04812; G06F 3/0485; G06F 3/0325; G06F 3/04842
  See application file for complete search history.

(56) References Cited

U.S. PATENT DOCUMENTS

| | | | |
|---|---|---|---|
| 9,030,422 B2 | 5/2015 | Kim et al. | |
| 2005/0212749 A1 | 9/2005 | Marvit et al. | |
| 2009/0303231 A1* | 12/2009 | Robinet | G06F 3/04815 345/419 |
| 2010/0042954 A1 | 2/2010 | Rosenblatt et al. | |
| 2010/0131691 A1 | 5/2010 | Chatterjee et al. | |
| 2011/0124414 A1* | 5/2011 | Sawano | H04N 5/4403 463/39 |
| 2011/0169729 A1 | 7/2011 | Holleis et al. | |
| 2011/0310041 A1* | 12/2011 | Williams | G06F 11/3672 345/173 |
| 2012/0017147 A1 | 1/2012 | Mark | |
| 2012/0019488 A1* | 1/2012 | McCarthy | G06F 3/03545 345/179 |
| 2012/0062604 A1* | 3/2012 | Lobo | G06F 3/0485 345/684 |
| 2012/0127088 A1* | 5/2012 | Pance | G06F 3/016 345/173 |
| 2012/0206391 A1 | 8/2012 | Kim et al. | |
| 2012/0208466 A1* | 8/2012 | Park | G06F 1/1601 455/41.3 |

OTHER PUBLICATIONS

Jun. 17, 2015 (retrieved)—(WO) Written Opinion of the ISA—App PCT/EP2012/075775.
"Advanced Digital Signal Processing and Noise Reduction, Fourth Edition" by Saeed V. Vaseghi, John Wiley & Sons Ltd., 2008.
"Smoothing Noisy Data with Spline Functions—Estimating the Correct Degree of Smoothing by the Method of Generalized Cross-Validation", by Peter Craven and Grace Wahba, Numerische Mathematik, vol. 31, 377-403, Springer-Verlag 1979.
Amended Claims filed after Receipt of the European Search Report dated Apr. 29, 2016, pp. 1-8.
Reply to Communication From the Examining Division dated Jul. 26, 2017, pp. 1-13.
Communication from the Examining Division dated Apr. 14, 2017, pp. 1-6.
Apr. 18, 2017—(EP) Office Action—App 12813307.1.
Dec. 18, 2017—(CN) Notification of the First Office Action—App 201280078195.0, Eng Tran.

* cited by examiner

SELECTION SYSTEM FOR AN INTERACTIVE DISPLAY

BACKGROUND OF THE INVENTION

The present invention relates to a system for performing interaction between a mobile device and an interactive display system.

DESCRIPTION OF THE RELATED ART

Presently, in the so-called Smart City environments, with the term "interactive display system" it is intended any interactive system equipped with an electronic visual display and configured to offer services, such as providing information asked by users, connecting users to city services, allowing users to buy goods, and so on. In the present specification, two broad categories of interactive display systems will be identified, namely the "kiosks" and the "public displays". While a kiosk is a system meant to be used privately (such as an automated teller machine), a public display is a system meant to be used by a large audience (such as the schedule billboard in a train station).

Interactive display systems should be carefully designed in order to allow users to exploit personalized services when the interactive display systems are located in public environments attended by a high amount of people. For this purpose, an optimized interactive display system should be capable of providing personalized information and allowing personalized financial transactions in a safe way. Moreover, interactive display systems should be able to manage multiple simultaneous accesses by multiple users, and support multiple users operating the interactive display system at the same time in a collaborative or parallel way.

For this purpose, interactive display systems need to be equipped with input interfaces, for allowing users to input data and/or commands, which are able to efficiently operate in public environments.

Presently available kiosks are equipped with physical buttons and/or a touchscreen. Conversely, standard touchscreens cannot be employed for equipping public displays, since they are not capable of efficiently managing multiple parallel accesses. Other input interfaces for interactive display systems have recently being contemplated and studied, such as for example proximity sensors capable of recognizing and interpreting free hand gestures. Several studies have been carried out about using smartphones as input interfaces, because of the ever increasing widespread of such devices among the population. Indeed, modern smartphones are provided with efficient data exchange capabilities, exploiting for example the Bluetooth, RFID (Radio Frequency IDentification) and/or NFC (Near Field Communication) communication protocol standards. Input interfaces of this type provides for establishing a wireless data link between the smartphone and a transceiver tag located at the interactive display system.

US patent application No. US 2011/0169729 discloses a method for performing an interaction between a mobile device and a screen having a plurality of NFC tags comprising data which can be read by said mobile device by using an NFC reader module of said mobile device to read a tag. An image which is part of an application service is displayed on said screen such that one or more tags of the screen correspond to the indication of respective inputs or selections which the user may choose through his mobile phone when using said application service. Said image being displayed on said screen is controlled by a server on which said application service is running. Said server is connected to said mobile phone of said user through a network link.

US patent application No. US 2012/0017147 discloses a method and a system for enabling interaction with projected user interface through user input gestures performed on a mobile device. The mobile device may project the user interface image on an external surface, such as from a pico projector, and detect user input gestures performed by users. The mobile device may interpret the detected user input gestures, and change the projected user interface image in response to the interpreted user input gestures. User input gestures may be in the form of touch gestures performed on a touchscreen of the mobile device and/or in the form of hand gestures performed by turning, rotating and/or hoping the mobile device.

European patent application No. EP 1914631 discloses a method for executing an interaction between a mobile device of a user and a Web service corresponding to a tag attached to a physical object. Said method comprises: reading the tag information contained in a tag attached to a physical object by a tag reading module of said mobile device, whereas said tag information contains a link to a storage location where a description of said Web service is stored; accessing said storage location by said mobile device to download said description of said Web service; generating an interaction manager which comprises a service client based on said downloaded Web service description to enable said user's device to interact with the Web service corresponding to said tag.

SUMMARY OF THE INVENTION

The Applicant has found that the above mentioned solutions known in the art are affected by drawbacks.

Both the solutions disclosed in US 2011/0169729 and EP 1914631 require that the selection of items is carried out by directly touching such item with the mobile device. Therefore, users have to necessarily reach the visual display. This drawback is particularly exacerbated in case the interactive display system is a public display, wherein the visual display may be uncomfortably wide and/or positioned in a location which is out of reach from the user. Moreover, the solution disclosed in US 2012/0017147 is quite complicated to be exploited, since it requires that the user interface is firstly projected, for example by a pico projector, on an external surface.

In view of the state of the art outlined in the foregoing, the Applicant has faced the problem of how to provide a system and a method for the interaction between a mobile device and an interactive display system which is capable of offering users with easy, comfortable and intuitive interaction interfaces.

An aspect of the present invention relates to a system for selecting, through a mobile device provided with accelerometer sensors, items of lists that can be displayed on a visual display of an interactive display system. The system includes a receiver module located at a surface of a user interaction station and adapted to wirelessly receive data from the mobile device when the mobile device is in short range communication with the receiver module. The user interaction station is distinct from the visual display. The system further includes a gesture acquisition module adapted to collect acceleration data received through the receiver module and generated by the accelerometer sensors in response to movements of the mobile device carried out when the mobile device is in short range communication with the receiver module. The system further includes a gesture recognition module adapted to associate the collected acceleration data with corresponding selection values over a selection scale. The system further includes an interaction control module adapted to control the interactive display system to select items based on said selection values.

According to an embodiment of the present invention, said acceleration data reflect how the acceleration experienced by the mobile device distributes among three orthogonal axes of a coordinate system integral with the mobile device. The gesture acquisition module is configured to collect a triplet of acceleration values including an acceleration value for each of said three orthogonal axes at every one of predetermined time instants. The gesture recognition module is configured to calculate for each triplet of acceleration values a corresponding selection value over the selection scale.

According to an embodiment of the present invention, the selection values may assume any possible value comprised between a higher endpoint of the selection scale and a lower endpoint of the selection scale.

According to an embodiment of the present invention, the selection values may assume only predetermined values comprised between a higher endpoint of the selection scale and a lower endpoint of the selection scale.

According to an embodiment of the present invention, the interaction control module is configured in such a way that at any time instant there is a selected item among the items of the list. The interaction control module is further configured to carry out the selection of a new item among the items of the list based on a new selection value calculated by the gesture recognition module in response to movements of the mobile device.

According to an embodiment of the present invention, the interaction control module is configured to select the new item through a sequential scrolling of the list. The new item selection is carried out by sequentially moving along the items of the list with a scrolling speed based on the new selection value.

According to an embodiment of the present invention, the interaction control module is configured to select the new item through a direct access of the list. The new item selection is carried out by moving along the items of the list by a number of item positions in the list based on the new selection value.

According to an embodiment of the present invention, the interaction control module is configured to select the new item by selecting the item in the list which is located at a item position preceding the one of the previously selected item, or the item in the list which is located at a item position following the one of the previously selected item, based on the new selection value.

According to an embodiment of the present invention, the receiver module is configured to wirelessly interface with the mobile device through a short range communication protocol including one among an IrDA communication protocol, a RFID communication protocol, and a NFC communication protocol.

According to an embodiment of the present invention, the surface is adapted to lean the mobile device against it, and the receiver module is adapted to wirelessly receive data from the mobile device when the mobile device is leant against the surface of the user interaction station.

Another aspect of the present invention relates to a method for selecting, through a mobile device provided with accelerometer sensors, items of lists that can be displayed on a visual display of an interactive display system. The method includes operating the mobile device near a surface of a user interaction station for getting the mobile device into short range communication with a receiver module located at the surface. The user interaction station is distinct from the visual display. The method further comprises wirelessly receiving data from the mobile device, collecting acceleration data wirelessly received from the mobile device and generated by the accelerometer sensors in response to movements of the mobile device carried out when the mobile device is in short range communication with the receiver module, and associating the collected acceleration data with corresponding selection values over a selection scale. The method further comprises controlling the interactive display system to select items based on said selection values.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1:
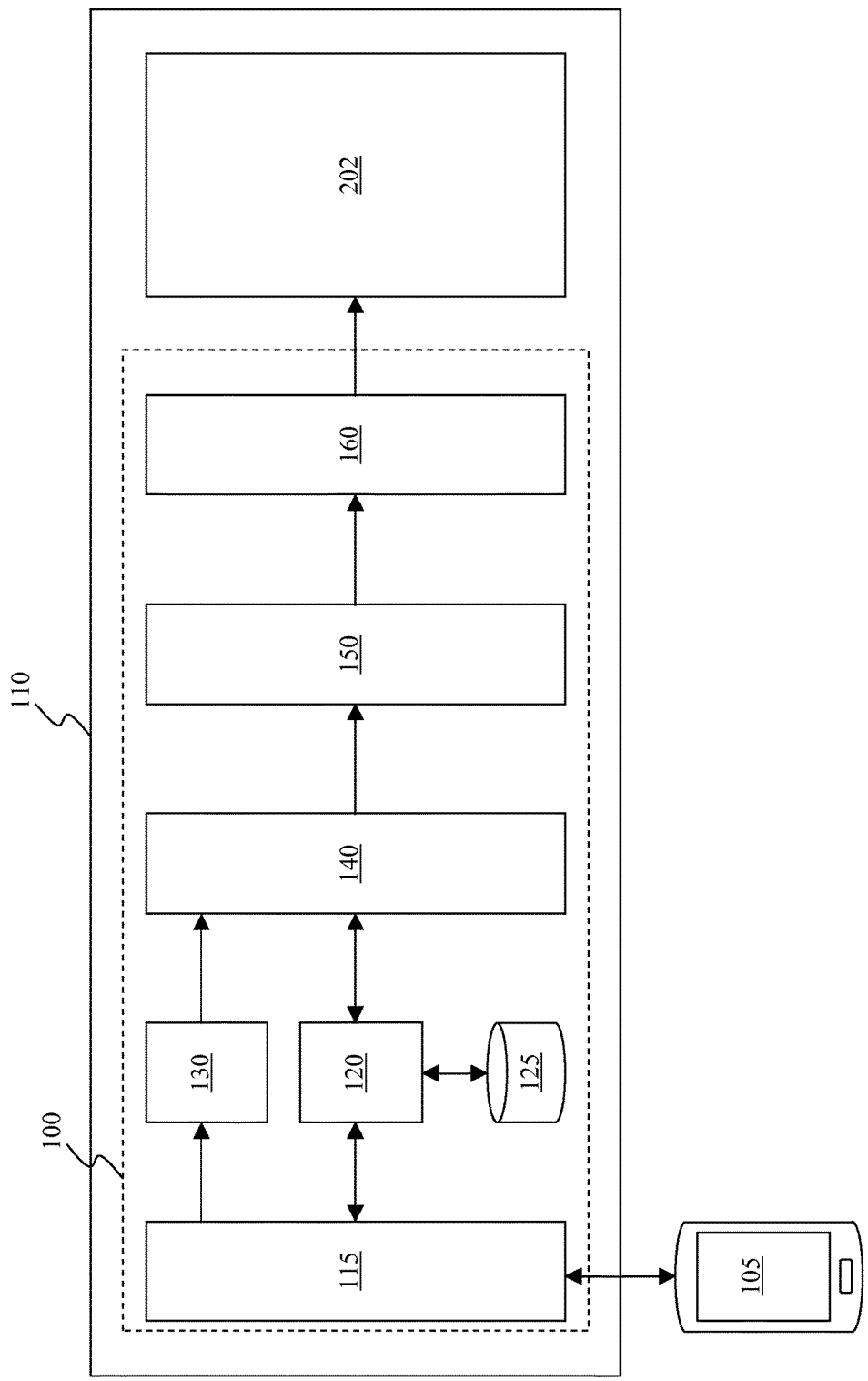
FIG. 1 illustrates in terms of functional modules a system for the interaction between a mobile device and an interactive display system according to an embodiment of the present invention.

With reference to the drawings, FIG. 1 illustrates in terms of functional modules a system 100 for the interaction between a mobile device 105 (such as a smartphone) provided with accelerometer sensors and an interactive display system 110 (such as a kiosk or a public display) provided with an electronic visual display adapted to display information in form of text, pictures, videos and so on, according to an embodiment of the present invention.

According to an embodiment of the present invention, the system 100 is configured to allow a user to interact with the interactive display system 110 by using his/her personal mobile device 105 as a manual movement-driven input controller. In other words, instead of having to directly interact with the interactive display system 110 through keyboards provided on the interactive display system itself, or using the visual display itself as an input interface, the system 100 according to an embodiment of the present invention allows users to input commands to the interactive display system 110 through movements of the mobile device 105. As will be described in detail in the following of the description, the system 100 according to an embodiment of the present invention is configured to interpret multidimensional movement data received from the accelerometer sensors of the mobile device 105 and map such multidimensional movement data on a "constrained" space in order to allow the mobile device 105 to be used as if it was a manual movement-driven input controller of the interactive display system 110 having a definite number of degrees of freedom. For example, according to an embodiment of the present invention, the system 100 is configured to map the movement data provided by the mobile device 105 on a one-dimensional space, in such a way that the mobile device 105 is used as a manual movement-driven input controller having only one degree of freedom, such as for example like a knob (which may be rotated clockwise and counterclockwise), a lever (which may be pulled and pushed), a cursor (which may be slid upwards and downwards or leftwards and rightwards), and so on.

The functional modules of the system 100 according to the embodiments of the invention—which will be described in detail in the following of the present description—may be dedicated hardware modules, program instructions modules adapted to run on corresponding hardware units, as well as a combination of the two. In the embodiment of the invention illustrated in FIG. 1, the system 100 is entirely located on the interactive display system 110. However, similar considerations apply in case some of the functional modules of the system 100 are located on the mobile device 105 and/or implemented by a different, dedicated hardware unit.

According to an embodiment of the present invention, the system 100 comprises a transceiver module 115 adapted to wirelessly exchange data with the mobile device 105 exploiting low power consumption and short range (i.e., lower than one meter, preferably lower than fifty centimeters, and more preferably lower than ten centimeters) communication protocol, such as RFID, IrDA or NFC. The transceiver module 115 acts as an access point through which commands and data are carried from the mobile device 105 to the modules of the system 100 (and vice versa). The transceiver module 115 may be for example a circuit unit powered by the interactive display system 100, or a passive transceiver microchip (also referred to as "tag") configured to be powered by the Radio Frequency (RF) field generated by the mobile device 105 itself. In order to ensure that the wireless interconnection properly operates, the mobile device 105 should be placed as close as possible to the transceiver module 115 (this is especially true in case of NFC communication protocol). In this regard, hereinafter a mobile device 105 is said to be in short range communication with the transceiver module 115 if the mobile device 105 is wirelessly interfaced with the transceiver module 115 exploiting a low power and short range communication protocol, with the distance between the former and the latter being lower than one meter, preferably lower than fifty centimeters, and more preferably lower than ten centimeters (the distance depending on the specific communication protocol being employed). Making reference for example to the NFC communication protocol, a mobile device 105 is in short range communication if the mobile device 105 is about 3-4 cm or less from the transceiver module 115.

Figure 2:
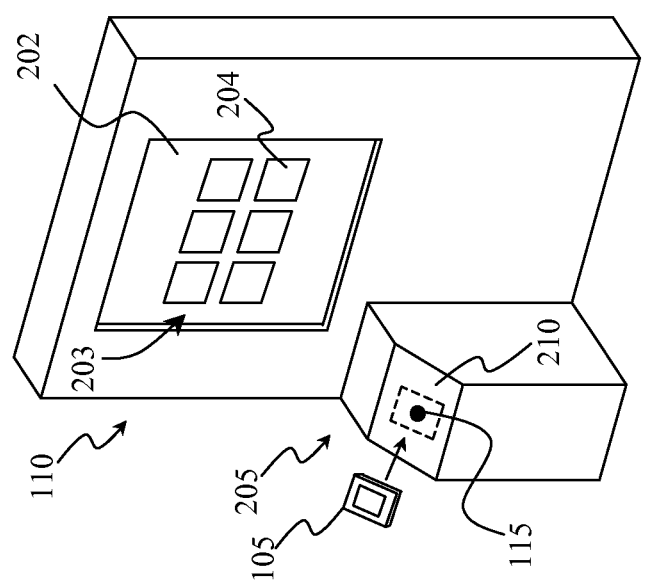
FIG. 2 is an isometric view of a very simplified interactive display system including an electronic visual display.

FIG. 2 is an isometric view of a very simplified interactive display system 110 including an electronic visual display 202 adapted to display information in form of text, pictures, videos and so on. Specifically, the electronic visual display 202 is adapted to display a list 203 comprising selectable items 204 whose number, aspect and function depend on the type of service offered by the interactive display system 110. Multilevel lists are also contemplated, wherein some of the items 204, when selected, allow to access corresponding sub-lists.

According to an embodiment of the present invention, the transceiver module 115 is located at a user interaction station 205 configured to have the mobile device 105 lean against it during the interaction of the mobile device 105 and the interactive display system 110. In order to assist the user, the user interaction station 205 advantageously includes an interaction panel 210 having a center on which the transceiver module 115 is located. Preferably, although not limitatively, the interaction panel 210 is slanted with respect to the ground plane. When the user places the mobile device 105 on the interaction panel 210 (as illustrated in FIG. 2 in dashed line), the distance between the mobile device 105 and the transceiver module 115 is such to allow establishment of short range communication therebetween. According to an embodiment of the present invention, the user interaction station 205 is reachable by the user, and is distinct, e.g., spaced away, from the electronic visual display 202. In this way, the user may easily and comfortably interact with the interactive display system 110 without having to necessarily reach the electronic visual display 202. This is particularly useful in case the interactive display system 110 is a public display, wherein the electronic visual display 202 may be uncomfortably wide and/or positioned in a location which is out of reach from the user.

It has to be appreciated that the system 100 is also configured to allow the interaction of the mobile device 105 with the transceiver module 115 without requiring a direct physical contact of the mobile device 105 against the interaction panel 205, on condition that the mobile device 105 is close to the interaction panel 205 in such a way to allow the mobile device 105 to wirelessly interface with the transceiver module 115 exploiting a low power and short range communication protocol.

Returning back to FIG. 1, according to an embodiment of the present invention, the system 100 includes a user identification module 120 configured to carry out a user identification procedure directed to grant access to the user and/or univocally identify the user of the mobile device 105 in order to personalize the interaction with the interactive display system 110. The user identification may be based on a Subscriber Identity Module (SIM), a username/password, a Personal Identification Number (PIN) and/or a biometric authentication procedure. The user identification module 120 is configured to automatically initiate the user identification procedure as soon as the mobile device 105 is placed at a distance from the transceiver module 115 such to allow to establish a short range communication therebetween. Once the user has been identified, personal information associated thereto may be retrieved from a user database 125, for example directly located in the interactive display system 110 or remotely accessible by the latter through a network link, such as the Internet. Such personal information influences the content and/or the aspect of the list 203 displayed on the electronic visual display 202, and depends on the type of service offered by the interactive display system 110. For example, in case the interactive display system 110 is configured to offer tourist information, the user database 125 may store, for each user which has already exploited the service, the user's preferences on attractions or locations based on his/her previous interaction experiences. As another example, in case the interactive display system 110 is configured to offer a bike rental service, the user database 125 may store rental card balances and billing information for each user.

According to an embodiment of the present invention, when a mobile device 105 interfaces with the transceiver module 115 and the user thereof has been identified by the user identification module 120, the system 100 is configured to temporally prevent the interconnection with further mobile devices 105, so as to avoid the occurrence of communication conflicts.

According to an embodiment of the present invention, the system 100 further includes a gesture acquisition module 130 adapted to collect from the mobile device 105 (through the transceiver module 115) acceleration data generated by accelerometer sensor devices (not shown in the figures) provided on the mobile device 105 itself. The gesture acquisition module 130 is configured to uninterruptedly collect acceleration data from the mobile device 105 as long as the wireless interconnection with the interactive display system 110 is active. The accelerometer sensor devices are configured to measure how the acceleration experienced by the mobile device distributes among three orthogonal axes X, Y and Z of a coordinate system integral with the mobile device (see FIG. 3). When the mobile device 105 is at rest, the overall acceleration is equal to the standard gravity g. In this case, the way the standard gravity g distributes among the axes X, Y and Z depends on the way the mobile device 105 is rotated with respect to the earth surface. According to an embodiment of the present invention, the gesture acquisition module 130 is configured to collect at every one of predetermined time instants ti corresponding acceleration values x, y, z measured by the accelerometer sensor devices of the mobile device 105 along the axis X, Y and Z, respectively, arrange these acceleration values in a data table DT, and store such data table in a memory unit (not illustrated in figure), for example directly provided at the gesture acquisition module 130. The data table DT is updated every time instant ti, in such a way to keep track of the acceleration values x, y and z substantially in real time. An example of data table DT may be the following one:

| ti | x | y | z |
|---|---|---|---|
| 2.43039E+12 | −1.307553 | 9.507003 | −0.340509 |
| 2.43043E+12 | −1.035147 | 9.656827 | −0.231546 |
| 2.4305E+12 | −1.56634 | 9.507003 | −0.721878 |
| 2.43053E+12 | −2.410802 | 10.147159 | −0.953424 |
| 2.43057E+12 | −0.885323 | 11.372991 | −0.612916 |
| 2.4306E+12 | 2.301839 | 11.985906 | 0.531194 |
| 2.43064E+12 | 1.498238 | 11.985906 | 1.56634 |
| 2.43068E+12 | 1.266692 | 11.223166 | 3.336985 |
| 2.43071E+12 | −0.149824 | 10.228881 | 4.29041 |
| 2.43075E+12 | −1.94771 | 8.921328 | −0.040861 |
| 2.43078E+12 | −0.653777 | 7.354988 | −1.94771 |
| 2.43082E+12 | −1.416516 | 9.343558 | 1.035147 |
| 2.43085E+12 | −1.457377 | 8.853226 | 2.492524 |
| 2.43089E+12 | 0.299648 | 9.275456 | 1.879608 |
| 2.43093E+12 | 0.190685 | 9.697687 | 1.416516 |
| 2.43096E+12 | −1.076008 | 8.962189 | 1.797886 |

-continued

Figure 3:
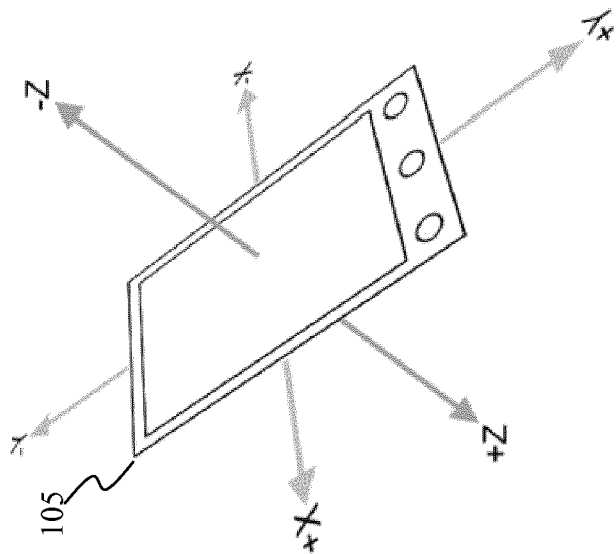
FIG. 3 shows three orthogonal axes of a coordinate system integral with the mobile device of FIGS. 1 and 2.

| ti | x | y | z |
|---|---|---|---|
| 2.431E+12 | −1.307553 | 8.689782 | 2.601486 |
| 2.43103E+12 | −1.416516 | 8.076866 | 3.568531 |
| 2.43107E+12 | −3.023717 | 7.668256 | 2.560625 |
| 2.4311E+12 | −4.481094 | 8.158588 | 1.879608 |
| 2.43114E+12 | −2.642348 | 7.818079 | 3.568531 |
| 2.43117E+12 | −4.140586 | 8.689782 | 3.827318 |
| 2.43121E+12 | −3.064578 | 9.997335 | 1.18497 |
| 2.43125E+12 | 3.827318 | 15.363752 | −3.255263 |
| 2.43128E+12 | 2.955616 | 10.56939 | 4.018002 | with the sign of each acceleration value x, y, z corresponding to the convention employed in FIG. 3.

Returning back to FIG. 1, according to an embodiment of the present invention, the system 100 further includes a gesture recognition module 140 configured to process the acceleration data stored in the data table DT so as to correlate them to gestures carried out by the user when moving the mobile device 105 on the user interaction station 205. For this purpose, the gesture recognition module 140 associates the sensed acceleration values x, y, z with corresponding selection values s over a chosen selection scale S. These selection values s are in turn used by the system 100 for carrying out selection operations, such as for the selection of specific items 204 visualized on the electronic visual display 202. For example, as will be described in the following of the present description, each item 204 may be made to correspond to a specific corresponding selection value s or to a specific corresponding interval of selection values s, or each selection value s may be made to correspond to a specific scrolling speed of the list of items. The user is thus granted to interact with the interactive display system 110 in an intuitive manner by handling the mobile device 105 just like if he/she was handling a manual movement-driven input controller.

In order to describe in detail how the gesture recognition module 140 operates, reference will be now made to the case in which the mobile device 105 is used as a virtual knob that, once placed on the interaction panel 210 of the user interaction station 205 (see FIG. 2), may be rotated (clockwise and counterclockwise) around a rotation axis perpendicular to the interaction panel 210 itself.

Figure 4B:
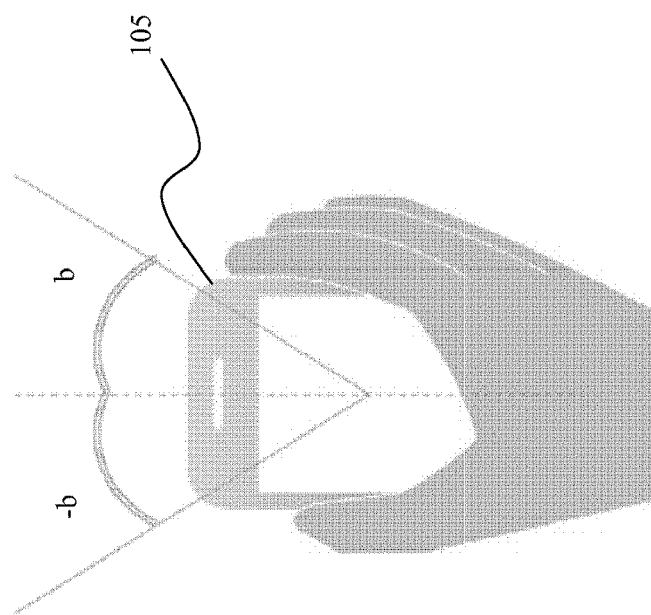
FIG. 4B depicts the rotation angle between a starting, vertical position of the mobile device, and a generic actual position of the mobile device.
Figure 4A:
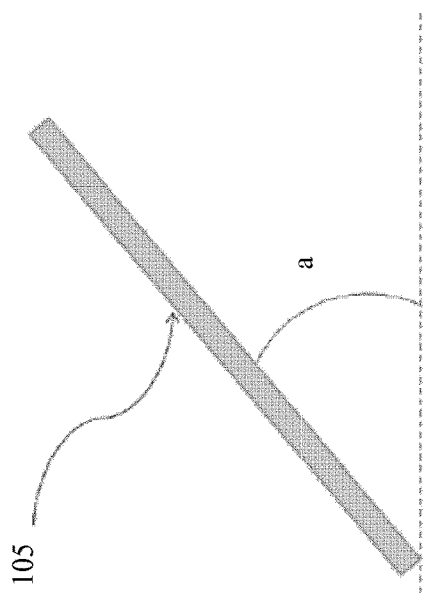
FIG. 4A depicts the inclination angle between the mobile device and the ground plane.

When the mobile device 105 is placed on the interaction panel 210, the angle between the mobile device 105 and the ground plane is denoted as "inclination angle" a (see FIG. 4A). The inclination angle a substantially corresponds to the inclination angle of the interaction panel 210 with respect to the ground plane. Preferably, for allowing the system 100 to efficiently operate, the inclination angle a (which substantially stand unchanged during the interaction) should belong to the interval (0, π/2] rad, and more preferably to the interval [π/6, π/4] rad. Therefore, also the interaction panel 210 preferably should be slanted with respect to the ground plane by an angle belonging to the interval (0, π/2] rad, and more preferably to the interval [π/6, π/4] rad. However, nothing prevents from having different angles.

Moreover, the angle between a starting, vertical position of the mobile device 105 when the mobile device 105 is placed on the interaction panel 210, and the generic actual position of the mobile device 105 is denoted as "rotation angle" b (see FIG. 4B). The rotation angle b varies as the user rotates the mobile device 105 in order to simulate the behavior of a knob during the interaction. The rotation angle b is equal to 0 when the mobile device 105 is in the starting, vertical position, and increases (in absolute value) as the mobile device 105 rotates away from the starting position. With the convention adopted in FIG. 4B, the rotation angle b may ideally assume values in the interval [0, π/2] for clockwise rotations, and in the interval [0, −π/2] for counterclockwise rotations; in practice, the rotation angle b will assume values in the interval [0, b1] for clockwise rotations, and in the interval [−b2, 0], with b1 (referred to as maximum clockwise rotation angle) and b2 (referred to as maximum counterclockwise rotation angle) which are lower than π/2.

Based on the acceleration values of the data table DT, the gesture recognition module 140 is configured to determine—for each time instant ti—the rotation angle b assumed by the mobile device 105 with respect to the starting position, and then, based on the rotation angle b, retrieving a corresponding selection value s (or an interval of selection values s) over the selection scale S.

Figure 5:
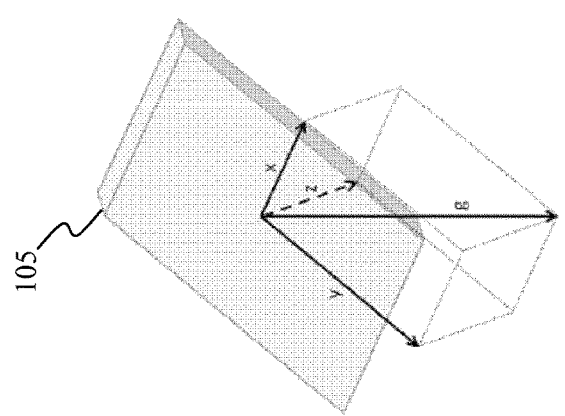
FIG. 5 depicts how the standard gravity distributes among the three orthogonal axes of FIG. 3.

By making reference to FIG. 5, and making the assumption that the acceleration provided by the user on the mobile device 105 during the gesture execution is negligible with respect to the standard gravity g, at each time instant ti the sum of the accelerations $\underline{x}$, $\underline{y}$ and $\underline{z}$ (hereinafter, in order to discriminate between a vector quantity and its module, the former will be identified by means of underlining) along the axes X, Y and Z is equal to the standard gravity $\underline{g}$ itself, i.e., the following relationship is valid for each time instant ti:

$$\underline{g} = \underline{x} + \underline{y} + \underline{z}. \tag{1}$$

Figure 6A:
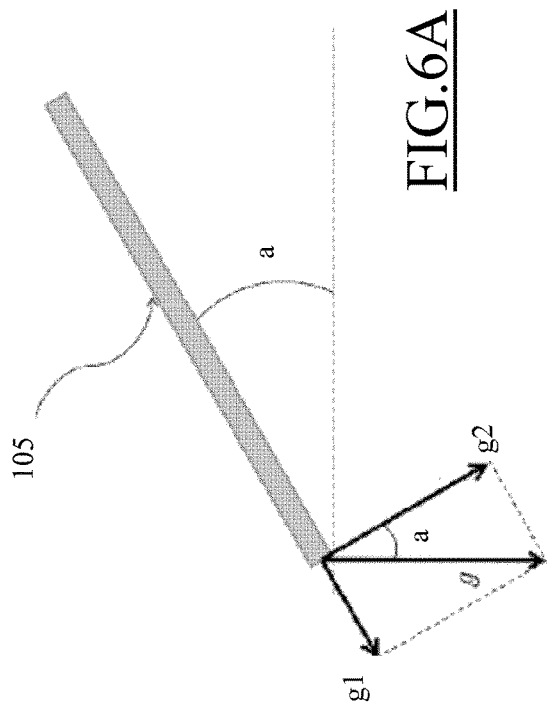
FIG. 6A depicts the component of the standard gravity parallel to the main surface of the mobile device and the component of the standard gravity perpendicular to the main surface of the mobile device.

Making reference to FIG. 6A, given an inclination angle a (which is known, being defined by the inclination of the interaction panel 210), the component $\underline{g1}$ of the standard gravity $\underline{g}$ parallel to the main surface of the mobile device 105 and the component $\underline{g1}$ of the standard gravity $\underline{g}$ perpendicular to the main surface of the mobile device 105 (which is in turn parallel to the direction Z) are the following ones:

$$g1 = g*\sin(a) \tag{2}$$

$$g2 = g*\cos(a) = z. \tag{3}$$

Figure 6B:
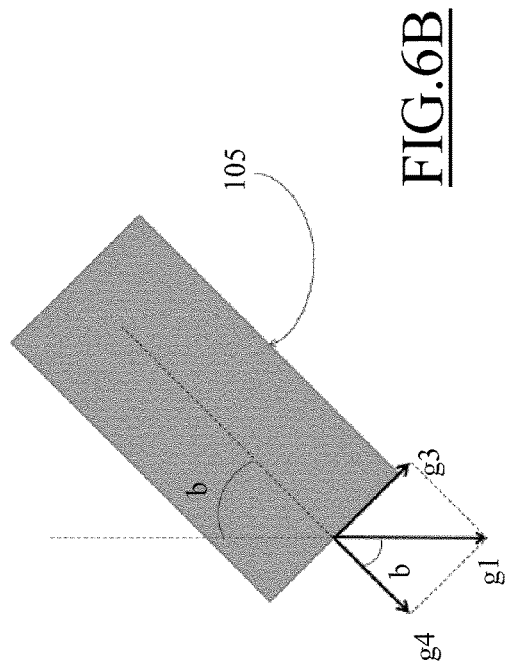
FIG. 6B depicts how the component of the standard gravity parallel to the main surface of the mobile device decomposes along two of the orthogonal axes of FIG. 3.

Similarly, making reference to FIG. 6B, given a rotation angle b (which varies as the user rotates the mobile device 105), the component $\underline{g1}$ of the standard gravity $\underline{g}$ may be expressed in turn by means of a component $\underline{g2}$ parallel to the direction X and a component $\underline{g4}$ parallel to the direction Y:

$$g3 = g1*\sin(b) = g*\sin(a)*\sin(b) = x \tag{4}$$

$$g4 = g1*\cos(b) = g*\sin(a)*\cos(b) = y. \tag{5}$$

The rotation angle b may be expressed in function of one between the acceleration values x and y:

$$b = \sin^{-1}\left(\frac{x}{g\sin(a)}\right) \tag{6}$$

$$b = \cos^{-1}\left(\frac{y}{g\sin(a)}\right). \tag{7}$$

Therefore, for each time instant ti, the gesture recognition module 140 computes the actual rotation angle b of the mobile device 105 using the acceleration value (x or y) in the corresponding tuple of the data table DT.

As previously mentioned, the gesture recognition module 140 is further configured to map the retrieved rotation angle b on a selection scale S so as to retrieve a corresponding selection value s (or a corresponding interval of selection values).

According to an embodiment of the present invention, given a selected scale S having a higher endpoint smax corresponding to b=b1 and a lower endpoint smin corresponding to b=b2, for each retrieved rotation angle b, the gesture recognition module 140 determines the corresponding selection value s in the following way:

$$b > 0 \rightarrow s = \left[\frac{b2}{(b1+b2)} + \frac{b}{b1}\right]*(s\max + s\min) \tag{8}$$

$$b < 0 \rightarrow s = \left[\frac{b2+b}{b1+b2}\right]*(s\max + s\min). \tag{9}$$

In this case, the scale S is referred to as continuous scale.

According to another embodiment of the present invention, instead of using a continuous scale S such as the one described above, wherein the selection value s may assume any possible value included in the interval [smin, smax], a discrete scale S may be employed, wherein the selection value s may assume only predetermined values smin, s1, s2, s3, . . . , smax, each one associated with a corresponding interval of selection values s calculated with equations (8) and (9). These associations may be carried out by subdividing the interval [smin, smax] in evenly distributed intervals of selection values s, as well as by carrying out the subdivision in a not-uniform way.

Figure 7B:
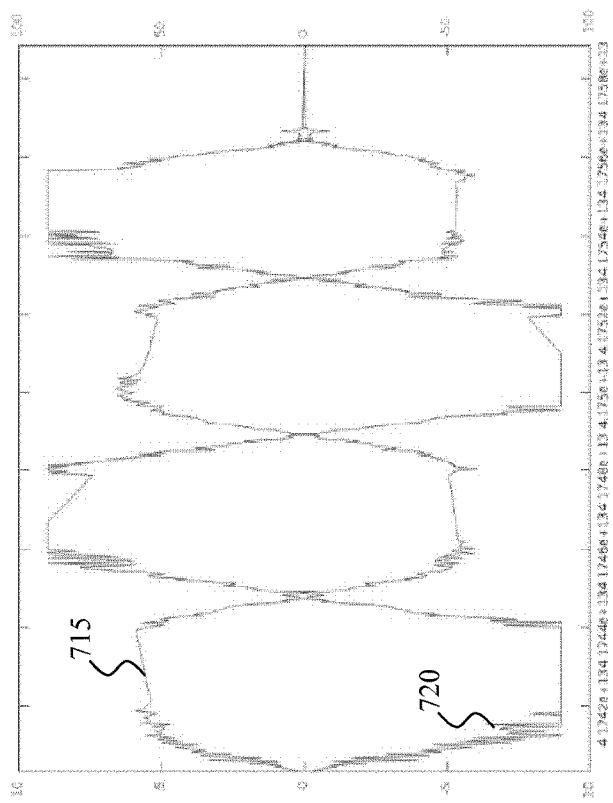
FIGS. 7A-7D illustrate how an acceleration value and the corresponding rotation angle evolve in time during exemplary application scenarios of embodiments of the present invention.
Figure 7A:
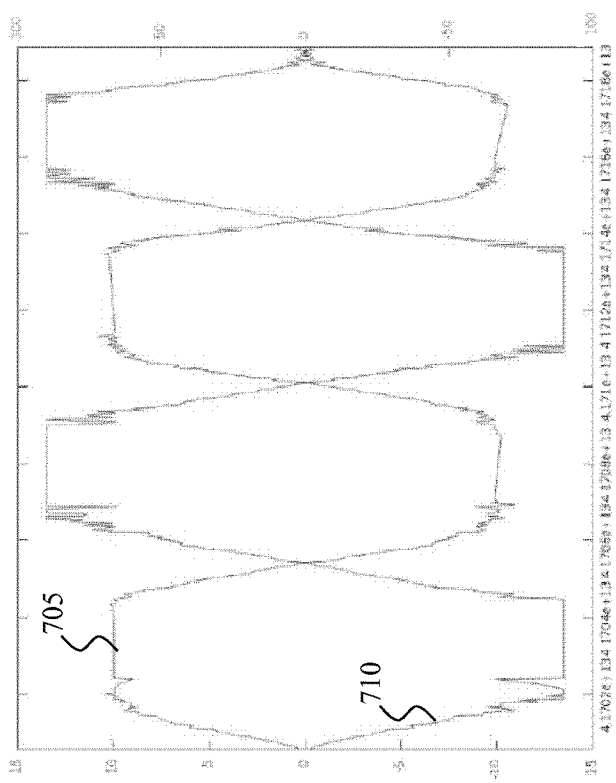

FIGS. 7A-7D illustrate how the acceleration value x and the corresponding rotation angle b evolve in time during exemplary application scenarios of embodiments of the present invention. Particularly:

FIG. 7A corresponds to a case in which the inclination angle a is equal to 90°; the evolution in time of the acceleration value x is identified with reference 705, while the rotation angle b is identified with reference 710.

FIG. 7B corresponds to a case in which the inclination angle a is equal to 30°; the evolution in time of the acceleration value x is identified with reference 715, while the rotation angle b is identified with reference 720.

Figure 7D:
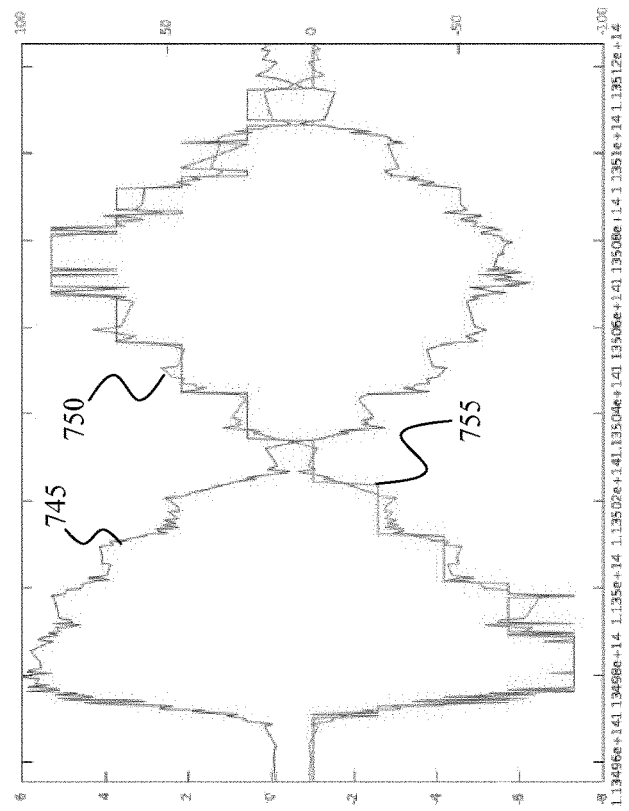
Figure 7C:
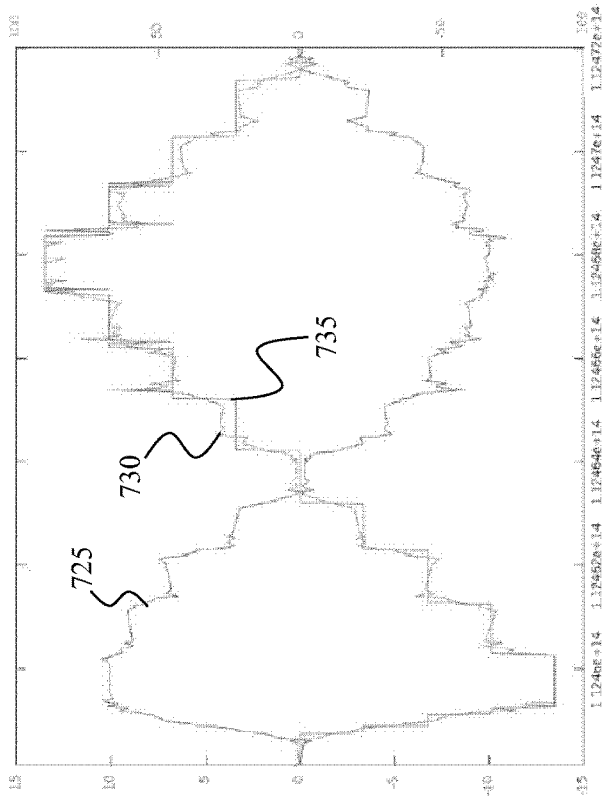

FIG. 7C corresponds to a case in which the inclination angle a is equal to 90°, and a discrete scale S is employed for the selection value s; the evolution in time of the acceleration value x is identified with reference 725, while the rotation angle b is identified with reference 730. FIG. 7C further illustrates how the (discrete) selection value s evolves in time with reference 735.

FIG. 7D corresponds to a case in which the inclination angle a is equal to 30°, and a discrete scale S is employed for the selection value s; the evolution in time of the acceleration value x is identified with reference 745, while the rotation angle b is identified with reference 750. FIG. 7D further illustrates how the (discrete) selection value s evolves in time with reference 755.

According to an embodiment of the present invention, the gesture recognition module 140 may be further configured to recognize upward/downward gestures performed by the user for carrying out further operations, as will be described later on.

Starting from a position of the mobile device 105 having a rotation angle b corresponding to a selection value s, a so called "upward gesture" provides for moving upward the mobile device 105 along a vertical direction on the interaction panel 210 and then moving downward to bring the mobile device 105 back to the initial position corresponding to the same selection value s. Similarly, a so-called "downward gesture" provides for carrying out a downward movement of the mobile device 105 on the interaction panel 210 followed by an upward movement. During the execution of an upward or a downward gesture, the external acceleration provided by the user on the mobile device 105 becomes non negligible compared to the standard gravity g.

According to an embodiment of the present invention, in order to recognize the upward and downward gestures, the gesture recognition module 140 monitors the evolution in time of the acceleration value y, taking into account that the acceleration value y decreases while the mobile device 105 is moved upward, and decreases while it is moved downward (using the axes convention illustrated in FIG. 3).

Figure 8:
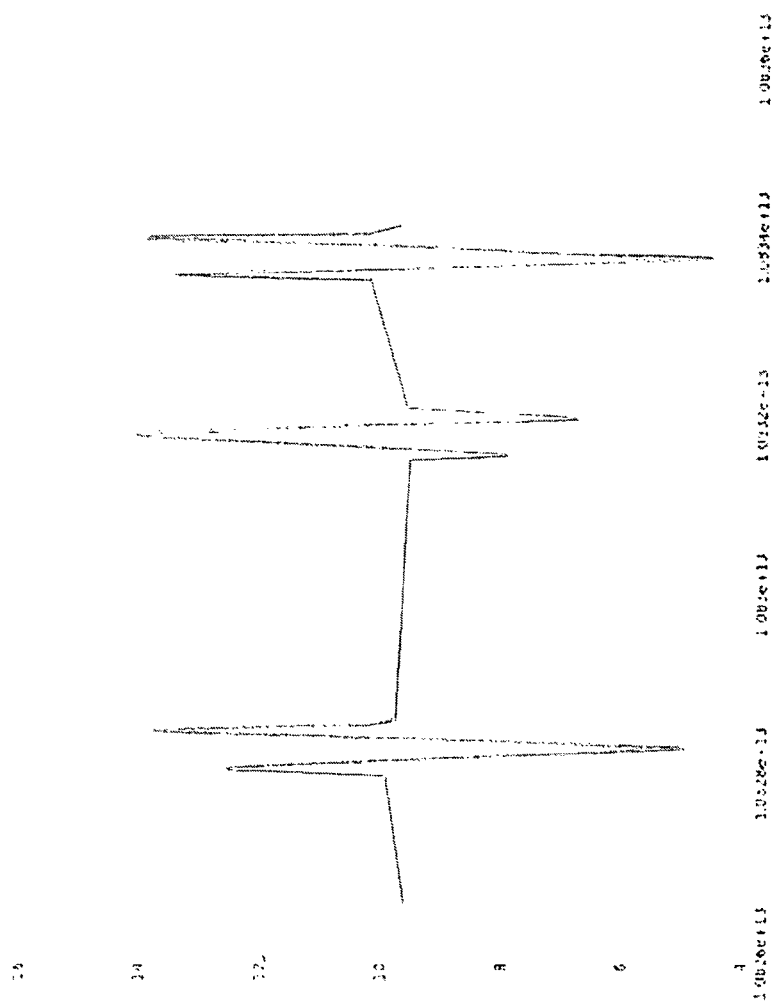
FIG. 8 illustrate an example of how an acceleration value may evolve in time when the user carries out a sequence of upward and downwards gestures, and FIG. 9 illustrate four possible exemplary list layouts which can be displayed on the electronic visual display of FIG. 2 during the interaction between the user and the interactive display system of FIG. 1.

FIG. 8 illustrate an example of how the acceleration value y may evolve in time when the user carries out a sequence of upward and downwards gestures (in the considered example, the inclination angle a is equal to π/2 and the rotation angle b is equal to 0).

The gesture recognition module 140 smoothes the curve obtained by the evolution in time of the acceleration value y using noise detection, interpolation and/or other techniques, such as for example the ones disclosed in "Advanced Digital Signal Processing and Noise Reduction, Fourth Edition" by Saeed V. Vaseghi, John Wiley & Sons Ltd., 2008, and/or in "Smoothing Noisy Data with Spline Functions—Estimating the Correct Degree of Smoothing by the Method of Generalized Cross-Validation", by Peter Craven and Grace Wahba, Numerische Mathematik, Vol. 31, 377-403, Springer-Verlag 1979. It has to be appreciated that other noise detection, interpolation and/or other techniques could be used, without affecting the scope of the present invention.

Then, the execution of an upward gesture is assessed if such curve includes—within a predetermined detection time window dtw (e.g., 0.5 seconds)—a positive-negative-positive peak sequence, while the execution of a downward gesture is assessed if the curve includes—within the detection time window dtw—a negative-positive-negative peak sequence.

According to an embodiment of the present invention, the downward gesture may be used by the user to confirm a selected item 204 of the list 203, and the upward gesture to go back to a previous list (in case of multilevel lists), or vice versa.

According to an embodiment of the invention, the confirmation of a selected item 204 of the list 203 may be also carried out by pressing a button on the mobile device 105, or by means of touch gestures performed on the touchscreen thereof. According to an embodiment of the present invention, timed item confirmation is also contemplated, wherein a selected item 204 is confirmed after a predetermined time is elapsed without any new item selection being carried out.

If the user has an impaired movement capability, he/she may not be capable of rotating the mobile device 105 to an extent such that the rotation angle b spans the whole intervals [0, b1] and [−b2, 0] which a standard user is capable of reaching. Therefore, users with impaired movement capabilities hardly would be able to select items 204 requiring selection values s corresponding to large (in absolute value) rotation angles b. For this reason, according to an embodiment of the present invention, the system 100 (see FIG. 1) further comprises a user adaptive module 150 configured to adapt the gesture recognition capability of the gesture recognition module 140 in order to allow users with impaired movement capabilities to select also those items 204 corresponding to large rotation angles b. According to an embodiment of the present invention, the user adaptive module 150 is configured to carry out user training operations directed to determine for each user corresponding maximum rotation intervals [0, b1] and [−b2, 0], in order to accordingly adapt the scale S.

During a user training operation, the user is requested (for example, through instruction messages visualized on the electronic visual display 202) to rotate in the clockwise direction the mobile device 105 until the maximum rotation angle b he/she is capable of reaching; then, the user adaptive module 150 sets the maximum clockwise rotation angle b1 to such maximum rotation angle b (measured using equation (7)). Afterward, the user is requested to rotate in the counterclockwise direction the mobile device 105 until the maximum rotation angle b he/she is capable of reaching; then, the user adaptive module 150 sets the maximum counterclockwise rotation angle b2 to such maximum rotation angle b. At this point, the scale S is determined as previously described, setting the higher endpoint smax to b=b1 and the lower endpoint smin to b=b2. In this case as well, when a discrete scale S is adopted, the interval [smin, smax] may be subdivided in intervals of evenly distributed selection values s, as well as by carrying out the subdivision in a not-uniform way.

According to an embodiment of the present invention, the system 100 further comprises an interaction control module 160 (see FIG. 1), which is configured to control the interactive display system 110 to allow the user handling the mobile device 105 to browse the items 204 of the list 203 displayed on the electronic visual display 202 (see FIG. 2).

The browsing procedure implemented by the interaction control module 160 provides that at any time instant there is a selected item 204 in the list 203. The interaction control module 160 is designed to carry out the selection of a new item 204 based on the selection values s calculated by the gesture recognition module 140 in response to the gestures performed by the user.

In order to distinguish the currently selected item 204 from the other items 204 of the list 203 depicted on the electronic visual display 202, a graphical marker may be displayed to highlight such selected item 204. Alternatively, the selected item 204 may be also identified by directly changing the color or increasing the size of such item 204 or moving the item 204 in a specific portion of the electronic visual display 202.

Figure 9:
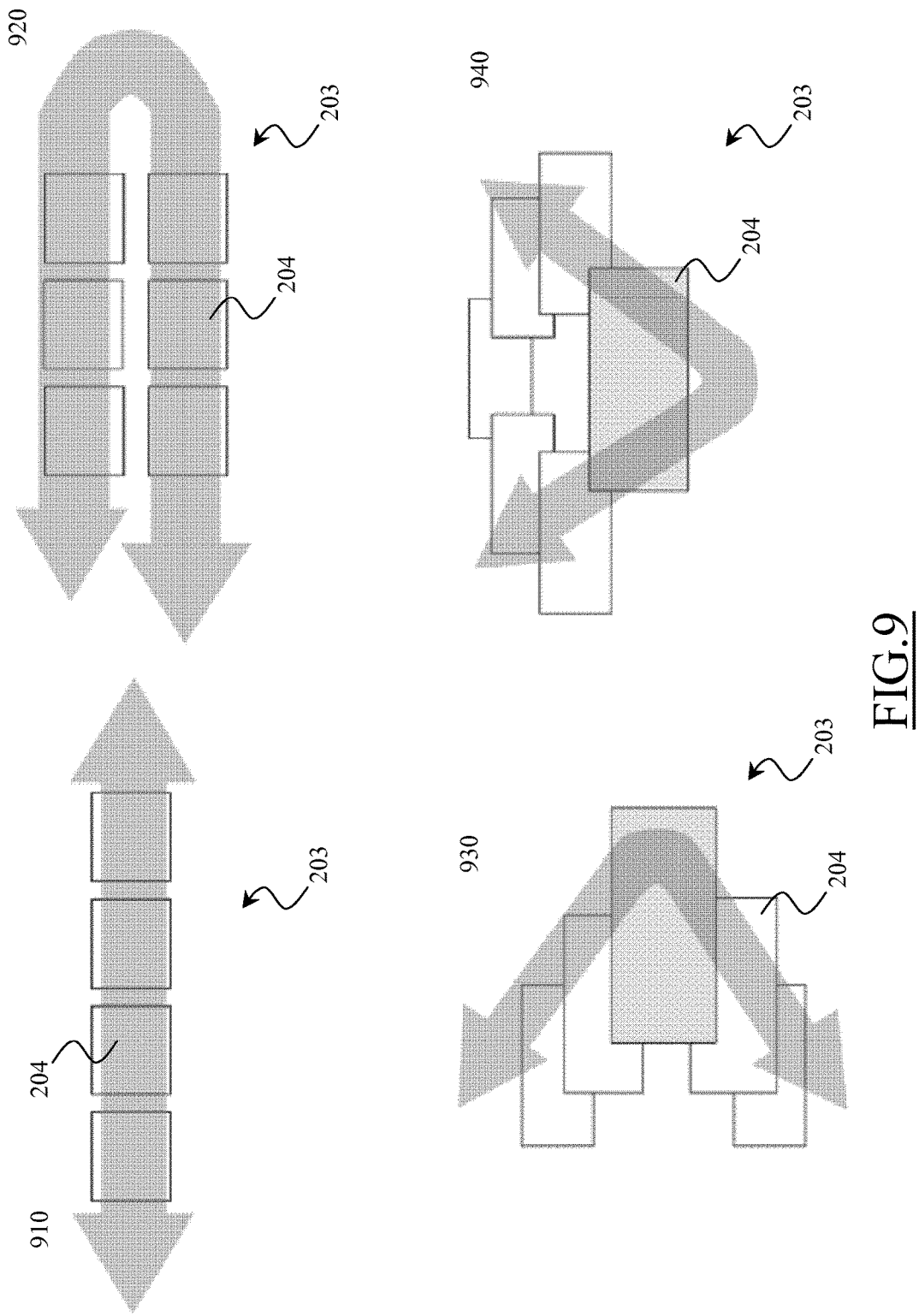

Making for example reference to the case in which the actually selected item 204 is identified through a movable marker, in order to select a new item 204 within the list 203, the marker is moved to the new item 204. The interaction control module 160 is configured to initially select a predefined item 204 of the list 203, such as the first (e.g., the leftmost) or the central item 204, by moving the marker thereto. Then, in order to change the actual item selection, the interaction control module 160 is configured to move such marker to another item 204 of the list 203 based on the selection values s received from the gesture recognition module 140 in response to the gestures performed by the user. Once the user has selected a desired item 204 of the list 203, such selection is confirmed by the user itself, for example through the above described upward or downward gestures, or by pressing a confirmation key on the mobile device 105. FIG. 9 illustrates four possible exemplary list 203 layouts which can be displayed on the electronic visual display 202 during the interaction between the user and the interactive display system 110. In the list layout identified by reference 910, the items 204 are arranged in a row. In this case the selection of the items 204 is carried out by moving the marker along the row according to the left or the right directions. In the list layout 920, the items 204 are arranged in a two-dimension grid comprising more than one row. In this case as well, the marker may be moved along a row of the grid according to the left or the right directions; when an item 204 located on an end of a row is overstepped, the marker is moved on a corresponding item located on a corresponding end of another row. In the list layout identified by reference 930, the items are arranged according to a vertical carousel arrangement, wherein the marker may be moved upward or downward. In the list layout identified by reference 940, the items are arranged according to a horizontal carousel arrangement, wherein the marker may be moved clockwise or counterclockwise.

According to an embodiment of the present invention, the interaction control module 160 provides for changing the item 204 selection (e.g., moving the marker from an item 204 of the list 203 to another item 204) according to different modalities structured to provide a natural, intuitive and flexible user interface. According to an embodiment of the present invention, the interaction control module 160 is configured to implement at least one among three different selection modalities, referred to as "continuous selection" modality, "step-by-step selection" modality and "progressive step-by-step selection" modality, which will be described in detail later on.

All these three modalities provides for implementing the item 204 selection starting from the selection value s calculated by the gesture recognition module 140 (and, if used, by the user adaptive module 150). By separating the computation of the selection value s (carried out by modules 140 and 150) from the actual way the items 204 are selected (carried out by module 160) allows for a great flexibility.

Advantageously, according to an embodiment of the present invention, once the selection value s is computed, the interaction control module 160 is configured to use the selection modality that best fit the actual situation (and possibly varying the selection modality in the course of the user interaction).

Continuous Selection Modality

In this case, the selection of the items 204 is carried out by the interaction control module 160 through a sequential scrolling of the list 203, wherein the item 204 selection (e.g., the marker) changes by sequentially moving along the items 204 of the list 203 with a scrolling speed based on the selection value s received from the gesture recognition module 140. According to an embodiment of the invention, the interaction control module 160 is configured to set said scrolling speed proportionally to the received selection value s. It has to be appreciated that in this case the list 203 is scrolled in a continuous way even if the selection value s has been determined using a discrete scale S, with each discrete selection value s that corresponds to one among a plurality of preset scrolling speeds (e.g., slow, medium, fast, faster). According to an embodiment of the invention, positive and negative selection values s correspond to scrolling speeds along opposite directions. According to another embodiment of the invention, instead of directly setting the scrolling speed proportionally to the selection value s received from the gesture recognition module 140, the interaction control module 160 may be configured to carry out preliminary operations thereon, such as changing the sign, multiplying by a scaling coefficient and/or adding or subtracting a translating coefficient.

Step-by-Step Selection Modality

In this case, the selection of the items 204 is carried out by the interaction control module 160 through a direct access of the list 203, wherein the item 204 selection (e.g., the marker) changes by moving along the items 204 of the list 203 by a number of items 204 positions based on the selection value s received from the gesture recognition module 140. According to an embodiment of the invention, the interaction control module 160 is configured to select the item 204 in the list 203 which is located at a number of item positions after/before the previously selected item 204 that is proportional to the received selection value s. According to an embodiment of the invention, if the selection value s has been determined using a discrete scale S, the number of item positions may be directly mapped onto the discrete selection values s. Advantageously, according to an embodiment of the present invention, when the list 203 is of the multilevel type and includes sub-lists having different number of items 204, the interaction control 160 is configured to adapt the way the step-by-step item 204 selection is carried out based on the specific selected list, i.e., by moving along the items 204 of a list 203 by a number of items 204 positions which depends on the length of such list 203. In this case, the number of item 204 positions involved in an item 204 selection movement caused by a same received selection value s is set higher for a list (or sub-list) 203 including a first number of items 204 than for a list (or sub-list) 203 including a second number of items 204 lower than the first number.

Progressive Step-by-Step Selection Modality

In this case, the selection of the items 204 is carried out by the interaction control module 160 by moving the selection along the items 204 of the list 203 forward/backward by a single item 204 position based on the selection value s received from the gesture recognition module 140. For example, according to an embodiment of the invention, the interaction control module 160 is configured to select the item 204 in the list 203 which is located at the item position which precedes the one of the previously selected item 204 if the selection value s is lower than an intermediate selection value s (such as s=0), and to select the item 204 in the list 203 which is located at the item position which follows the one of the previously selected item 204 if the selection value s is higher than the intermediate selection value s. In other words, according to this selection modality the movements of the mobile device 105 are interpreted as a set of impulses to move the item 204 selection along the list 203 in one or the opposite direction. This selection modality is particularly useful when the list 203 includes a very small number of items 204, since it avoids that the user misses the selection of a desired item 204 by surpassing it.

Naturally, in order to satisfy local and specific requirements, a person skilled in the art may apply to the solution described above many logical and/or physical modifications and alterations. More specifically, although the present invention has been described with a certain degree of detail with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

The invention claimed is:

1. A system for selecting, through a mobile device provided with accelerometer sensors, items of a list that can be displayed on a visual display of an interactive display system, the system including:

a receiver located at a surface of a user interaction station and adapted to wirelessly receive data from the mobile device when in short range communication with the mobile device, the user interaction station being distinct from the visual display, wherein the surface is adapted to allow the mobile device to lean against the surface of the user interaction station, and wherein the receiver is adapted to wirelessly receive data from the mobile device when the mobile device leans against the surface of the user interaction station; and a processor configured to:
  collect acceleration data received through the receiver and generated by the accelerometer sensors in response to movements of the mobile device along the surface of the user interaction station and carried out when the mobile device is in short range communication with the receiver,
  associate the collected acceleration data with corresponding selection values over a selection scale by determining, based on the collected acceleration data, a rotation angle assumed by the mobile device with respect to a mobile starting position,
  control the interactive display system to select items based on the selection values, and
  adapt a gesture recognition capability, by determining, for each user, corresponding maximum rotation angle intervals to adapt the selection scale.

2. The system of claim 1, wherein:
the acceleration data reflect how the acceleration experienced by the mobile device distributes among three orthogonal axes of a coordinate system integral with the mobile device, the processor being configured to collect a triplet of acceleration values including an acceleration value for each of the three orthogonal axis at every one of predetermined time instants; and
the processor configured to calculate for each triplet of acceleration values a corresponding selection value over the selection scale.

3. The system of claim 2, wherein the selection values assume any possible value between a higher endpoint of the selection scale and a lower endpoint of the selection scale.

4. The system of claim 2, wherein the selection values assumes only predetermined values between a higher endpoint of the selection scale and a lower endpoint of the selection scale.

5. The system of claim 2, wherein the processor is configured in such a way that at any time instant there is a selected item among the items of the list, the processor being further configured to carry out the selection of a new item among the items of the list based on a new selection value calculated in response to movements of the mobile device.

6. The system of claim 5, wherein the processor is configured to select the new item through a sequential scrolling of the list, the new item selection being carried out by sequentially moving along the items of the list with a scrolling speed based on the new selection value.

7. The system of claim 5, wherein the processor is configured to select the new item through a direct access of the list, the new item selection being carried out by moving along the items of the list by a number of item positions in the list based on the new selection value.

8. The system of claim 5, wherein the processor is configured to select the new item by selecting the item in the list:
which is located at an item position preceding the one of the previously selected item, or
which is located at an item position following the one of the previously selected item, based on the new selection value.

9. The system of claim 1, wherein the receiver is configured to wirelessly interface with the mobile device through a short range communication protocol including one among:
an IrDA communication protocol,
a RFID communication protocol, and
a NFC communication protocol.

10. The system of claim 1, wherein the movements of the mobile device along the surface of the user interaction station comprise rotations of the mobile device along the surface of the user interaction station.

11. The system of claim 1, wherein the movements of the mobile device along the surface of the user interaction station comprise sliding movements of the mobile device along the surface of the user interaction station.

12. A method for selecting, through a mobile device provided with accelerometer sensors, items of a list that can be displayed on a visual display of an interactive display system, the method including:
operating the mobile device near a surface of a user interaction station for getting the mobile device into short range communication with a receiver located at the surface of the user interaction station, the user interaction station being distinct from the visual display, wherein the surface is adapted to allow the mobile device to lean against the surface of the user interaction station, and wherein the receiver is adapted to wirelessly receive data from the mobile device when the mobile device leans against the surface of the user interaction station;
wirelessly receiving data from the mobile device;
collecting acceleration data wirelessly received from the mobile device and generated by the accelerometer sensors in response to movements of the mobile device along the surface of the user interaction station and carried out when the mobile device is in short range communication with the receiver;
associating the collected acceleration data with corresponding selection values over a selection scale by determining, based on the collected acceleration data, a rotation angle assumed by the mobile device with respect to a mobile starting position;
controlling the interactive display system to select items based on said selection values; and
adapting a gesture recognition capability by determining, for each user, corresponding maximum rotation angle intervals to adapt the selection scale.

13. The method of claim 12, wherein:
the acceleration data reflect how the acceleration experienced by the mobile device distributes among three orthogonal axes of a coordinate system integral with the mobile device, the method comprising collecting a triplet of acceleration values including an acceleration value for each of the three orthogonal axis at every one of predetermined time instants; and
the method comprising calculating for each triplet of acceleration values a corresponding selection value over the selection scale.

14. The method of claim 13, wherein the selection values assume any possible value between a higher endpoint of the selection scale and a lower endpoint of the selection scale.

15. The method of claim 13, wherein at any time instant there is a selected item among the items of the list, the method comprising selecting a new item among the items of the list based on a new selection value calculated in response to movements of the mobile device.

16. The method of claim 15, wherein the selecting the new item comprises selecting the new item through a sequential scrolling of the list, the new item selection being carried out by sequentially moving along the items of the list with a scrolling speed based on the new selection value.

17. The method of claim 15, wherein the selecting the new item comprises selecting the new item through a direct access of the list, the new item selection being carried out by moving along the items of the list by a number of item positions in the list based on the new selection value.

18. The method of claim 15, wherein the selecting the new item comprises selecting the new item by selecting the item in the list:
- which is located at an item position preceding the one of the previously selected item, or
- which is located at an item position following the one of the previously selected item, based on the new selection value.

19. The method of claim 12, wherein the receiver is configured to wirelessly interface with the mobile device through a short range communication protocol including one among:
- an IrDA communication protocol,
- a RFID communication protocol, and
- a NFC communication protocol.

* * * * *